United States Patent
Lee et al.

(10) Patent No.: US 7,430,088 B2
(45) Date of Patent: Sep. 30, 2008

(54) RETRACTING METHOD OF HARD DISK DRIVE, HARD DISK DRIVE ADOPTING THE METHOD, AND RECORDING MEDIUM STORING PROGRAM FOR EXECUTING THE METHOD

(75) Inventors: Sang-hun Lee, Seoul (KR); Jae-deog Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/556,754

(22) Filed: Nov. 6, 2006

(65) Prior Publication Data

US 2007/0103809 A1 May 10, 2007

(30) Foreign Application Priority Data

Nov. 5, 2005 (KR) ............. 10-2005-0105745

(51) Int. Cl.
*G11B 19/02* (2006.01)
*G11B 17/32* (2006.01)

(52) U.S. Cl. ................... 360/73.03; 360/75
(58) Field of Classification Search .......... None
See application file for complete search history.

(56) References Cited

U.S. PATENT DOCUMENTS

| | | | | |
|---|---|---|---|---|
| 6,081,400 | A * | 6/2000 | Lu et al. | 360/75 |
| 6,353,510 | B2 * | 3/2002 | Drouin | 360/75 |
| 6,639,749 | B1 * | 10/2003 | Kazmierczak et al. | 360/75 |
| 6,765,746 | B2 * | 7/2004 | Kusumoto | 360/75 |
| 7,286,327 | B2 * | 10/2007 | Jeong | 360/256.2 |

FOREIGN PATENT DOCUMENTS

| | | |
|---|---|---|
| JP | 63-86168 | 4/1988 |
| JP | 64-8568 | 1/1989 |
| JP | 2-76176 | 3/1990 |
| JP | 4-38759 | 2/1992 |
| JP | 2000-76772 | 3/2000 |
| JP | 2000-260142 | 9/2000 |
| KR | 2000-62682 | 10/2000 |

OTHER PUBLICATIONS

Korean Office Action dated Nov. 18, 2006 issued in KR 2005-105745.

* cited by examiner

*Primary Examiner*—Hoa T. Nguyen
*Assistant Examiner*—James L Habermehl
(74) *Attorney, Agent, or Firm*—Stanzione & Kim, LLP

(57) ABSTRACT

A retracting method of compensating for a time for parking and unloading with an additional floating force obtained by additionally operating a spindle motor for a predetermined period after a retract operation is started, a hard disk drive (HDD) adopting the method, and a computer readable recording medium having a program for performing the method. The retracting method of the hard disk drive to retract a head to a retract area in response to detection of a retract condition includes driving the spindle motor at least for a predetermined period at the beginning of a retract operation to rotate a disk. The spindle motor is additionally driven for the predetermined period after the retract operation is started such that an additional floating force can be obtained, and thus, a time for parking and unloading is compensated for, and a stable retract operation is performed.

41 Claims, 6 Drawing Sheets

FIG. 4 (PRIOR ART)
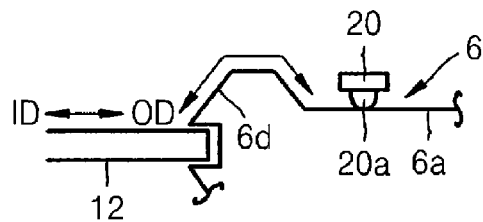
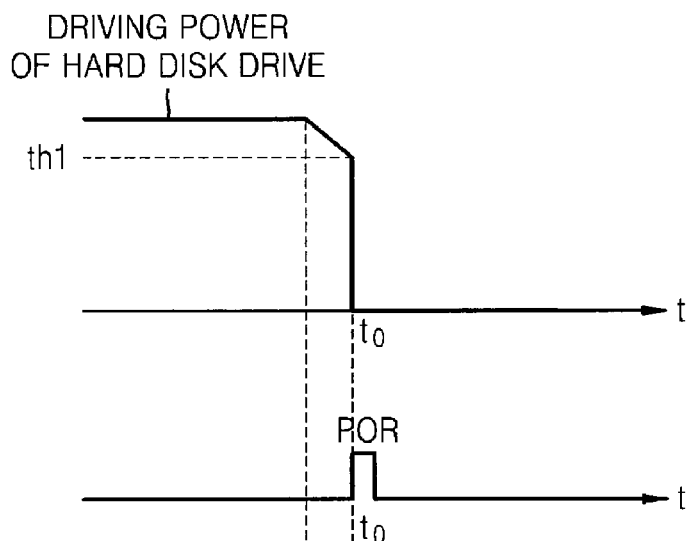
FIG. 5A (PRIOR ART)
FIG. 5B (PRIOR ART)
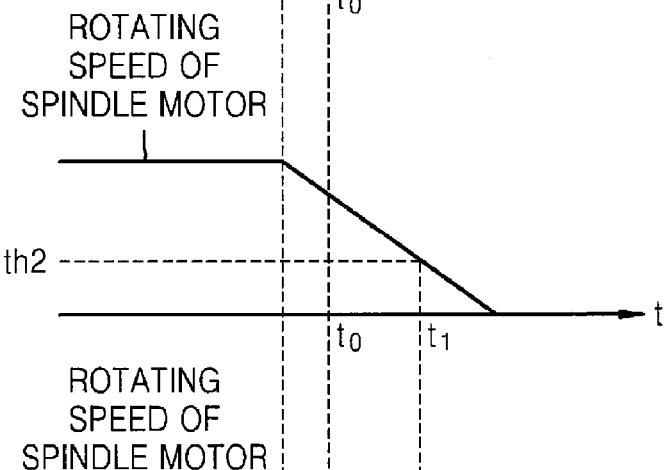
FIG. 5C (PRIOR ART)
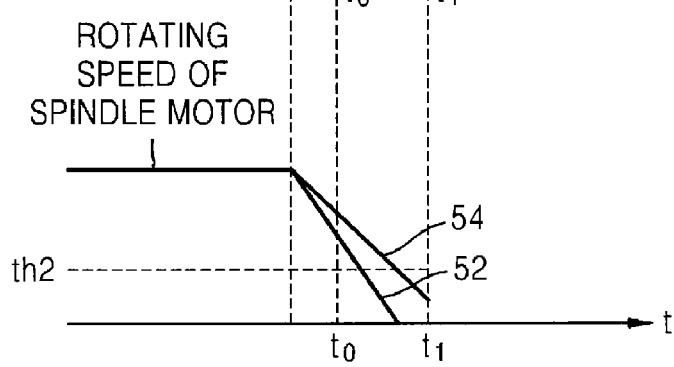
FIG. 5D (PRIOR ART)

RETRACTING METHOD OF HARD DISK DRIVE, HARD DISK DRIVE ADOPTING THE METHOD, AND RECORDING MEDIUM STORING PROGRAM FOR EXECUTING THE METHOD

CROSS REFERENCE TO RELATED APPLICATIONS

This application claims the priority of Korean Patent Application No. 2005-0105745, filed on Nov. 5, 2005, in the Korean Intellectual Property Office, the disclosure of which is incorporated herein in its entirety by reference.

BACKGROUND OF THE INVENTION

1. Field of the Invention

The present general inventive concept relates to a hard disk drive (HDD), and more particularly, to a retracting method of compensating for a time for parking or unloading of a head with an additional floating force obtained by additional driving of a spindle motor for a predetermined period after a retract operation is started, a hard disk drive (HDD) adopting the method, and a recording medium having a program to perform the method.

2. Description of the Related Art

A hard disk drive (HDD) is a recording device used to store information. In general, information is recorded on concentric tracks on a surface of at least one magnetic recording disk. A disk is mounted on a spindle motor to be rotated, and information is accessed by a head mounted on an actuator arm rotated by a voice coil motor (VCM). The VCM is excited by current to rotate an actuator and move a head.

The head senses a magnetic change generated from the surface of the disk to read information recorded thereon. In order to record data on the track, current is supplied to the head. The current generates a magnetic field, and the magnetic field magnetizes the disk surface.

In the HDD, a so-called retract operation of retracting the head to a parking zone or a ramp is performed when an idle state is continued more than a predetermined time, when an external shock is detected, when a free-fall is detected, when a drive of the HDD is terminated, and when a driving power of the HDD is suddenly blocked, in other words, when saving of power consumption is required or when the head and the disk need to be protected from an impact.

In the retract operation, a spindle motor driving power is blocked. Thus, the spindle motor becomes to rotate freely with a rotational inertia of the disk. In addition, the head is moved to the parking zone or unloaded onto the ramp by applying a back electromotive force generated by free rotation of the spindle motor to a VCM driver.

FIG. 1 illustrates a hard disk drive 100 adopting a parking method. Referring to FIG. 1, the hard disk drive 100 includes at least one disk 12 rotated by a spindle motor 14. The hard disk drive 100 further includes a head 16 that is located adjacent to the surface of the disk 12.

The head 16 can read or record information from or on the disk 12 that rotates, by sensing a magnetic field formed on the surface of the disk 12 or magnetizing the surface of the disk 12, respectively. Although a single head 16 is shown in FIG. 1, it should be understood that the head 16 includes a recording head for magnetizing the disk 12 and a separate reading head for sensing the magnetic field of the disk 12.

The head 16 is integrated with a slider (not shown) into a single unit, wherein the slider is configured to generate an air bearing between the head 16 and the surface of the disk 12. The slider is attached to a suspension 20, and the suspension 20 is combined with a head stack assembly (HSA) 22. The HAS 22 is attached to an actuator arm 24 having a voice coil 26. The voice coil 26 is located adjacent to a magnetic assembly 28 that defines a voice coil motor (VCM). A VCM driving current supplied to the voice coil 26 through a cable line 38 generates a torque to rotate the actuator arm 24 around a bearing assembly 32. Rotation of the actuator arm 24 may cause the head 16 to move across the surface of the disk 12. The cable line 38 is connected between a main controller (not shown) and the head 16 and the magnet assembly 28 to transmit data between the head 16 and the main controller and to transmit signals to control the magnet assembly 28 to move the head 16 with respect to the disk 12.

Information is stored in tracks of the disk 12. In general, the disk 12 includes a data zone 34, on which data is recorded, and a parking zone 36, on which the head 16 is parked.

In a retract operation of the hard disk drive 100 illustrated in FIG. 1, the head 16 is moved to an inner circumference of the disk 12, i.e., to the parking zone 36 illustrated by a dotted line of FIG. 1, by a back electromotive force generated in the spindle motor 14. The back electromotive force is detected, and a signal corresponding to the detected back electro-motive force is transmitted to the voice coil 26 of the VCM of the magnetic assembly 28, for example, through the cable line 38.

FIG. 2 illustrates a structure of a latch mechanism A of the hard disk drive 100 illustrated in FIG. 1. When the head 16 is moved to the parking zone 36, the latch mechanism A latches the actuator 22 so that the actuator 22 does not move. The latch mechanism A includes an iron-piece 40, which extends from an end of the actuator arm 24, and a permanent magnet 42 to attract the iron-piece 40 with its magnetic force.

FIG. 3 illustrates a hard disk drive adopting a ramp method. Since a ramp structure of a ramp 6 of FIG. 3 can be used in the hard disk drive of FIG. 1, like reference numerals denote like elements, and a detailed description thereof will be omitted.

In the retract operation, the HDD illustrated in FIG. 3 moves the head 16 to be placed on the ramp 6 installed in a side of the outer circumference of the disk 12 by the back electro-motive force generated in the spindle motor 14.

FIG. 4 is a cross-sectional view illustrating the ramp 6 of FIG. 3. As shown in FIG. 4, in the retract operation, the head 16 rises along an inclined surface 6d and is seated on a seating surface 6a. A protrusion 20a is installed under the slider (suspension) 20 to contact the ramp 6.

Recently, in accordance with increase of use of mobile devices adopting the hard disk drive, a size of the hard disk drive is gradually reduced. This means that the size and a rotational inertia of the disk, on which information is recorded, are reduced and the back electro-motive force generated in the spindle motor is reduced as well.

Therefore, in such a hard disk drive having a smaller size, it is difficult to obtain enough back electro-motive force from a spindle motor to move a head to the parking zone or raise the head onto the ramp.

In the retract operation, the head should be moved near to the parking zone while the disk is freely rotated by the rotational inertia or the head should be moved to the ramp while the back electro-motive force generated in the spindle motor is sufficient to raise the head along the incline of the ramp.

If the back electro-motive force generated in the spindle motor is not sufficient to move the head near to the parking zone or to the ramp, or to climb the head along the inclined surface of the ramp to be seated on a rest area of the ramp, the head becomes to land on the data area of the disk. Consequently, the head and the disk may be damaged.

FIGS. 5A-5D are graphs schematically illustrating a conventional retracting method in a case where a driving power of the hard disk drive 100 of FIG. 1 is suddenly blocked. FIG. 5A shows the driving power of the hard disk drive 100, FIG. 5B shows a power of reset signal (POR) generated when the driving power of the hard disk drive 100 falls less than a predetermined threshold value th1, FIG. 5C shows a desirable rotating speed of the spindle motor 14, and FIG. 5D shows an undesirable rotating speed of the spindle motor 14.

Referring to FIGS. 5A and 5B, the power reset signal POR is generated when the driving power of the hard disk drive 100 falls less than the predetermined threshold value th1, and the retract operation is started from a point of time t0. The threshold value th1 is about 15% lower than a regular driving power of the hard disk drive 100, for example, a driving power to drive the spindle motor 14 to rotate the disk to read or write data from or on the disk 12.

If the power reset signal POR is generated, a spindle motor driving power applied to the spindle motor driver driving the spindle motor 14 is blocked immediately. Accordingly, the spindle motor 14 freely rotates according to a rotational inertia of the disk 12 to generate the back electro-motive force. The back electro-motive force can control the voice coil to move the head to the ramp 6 or the parking zone 36.

Referring to FIG. 5C, the rotation speed of the spindle motor 14 decreases along the lapse of the time because of friction between the air and the disk 12 and a rotational friction of the spindle motor 14. If the rotational inertia of the disk 12 is sufficient, at a point of time t1, the head 16 can be moved near to the parking zone 36 or to the ramp 6. After a point of time t1, the head 16 is parked on the parking zone 36 or is raised onto the ramp 6.

In the hard disk drive 100 adopting the parking method, if the head 16 is completely moved to the parking zone 36, the actuator (actuator arm 24) is fixed by the operation of the latch mechanism A. Further, as the rotation speed of the spindle motor 14 decreases, a head-floating force is reduced and thus the head 16 becomes to land on the parking zone 36.

In the meantime, in the hard disk drive 100 adopting the ramp method, the head 16 rises along the inclined surface of the ramp 6 and is seated on the seating surface by the back electro-motive force generated in the spindle motor 14.

However, when the rotational inertia of the disk 12 is not large enough, a normal retract operation cannot be performed. When the retract condition is detected, supply of the spindle motor driving power to the spindle motor is terminated. Since the spindle motor is driven by the rotational inertia of the disk, the rotation speed of the spindle motor 14 decreases to generate a small amount of the back electro-motive force which is not enough to control the voice coil to move the head to the retract area, such as the parking zone 36 or the ramp 6.

As shown in graph 52 of FIG. 5D, if the back electromotive force generated in the spindle motor 14 is not sufficient to move the head 16 to the parking zone 36 or to the ramp 6, the head 16 becomes to land on the data area 34 of the disk 12. In the meantime, as shown in graph 54 of FIG. 5D, in the hard disk drive 100 adopting the ramp method, if the back electromotive force generated in the spindle motor 14 at the point of time t1 is not sufficient as much as the head can be raised onto the ramp 6, that is, if the rotating speed of the spindle motor 14 is less than a threshold value th2, the head 16 cannot be raised onto the ramp 6 and becomes to land on the data area 34 of the disk 12.

In the meantime, in order to compensate for an insufficient back electromotive force generated in the spindle motor 14, it can be considered to rapidly move the head 16. However, in this case, due to an inertia caused by a fast move, the head 16 collides to a crash stop (not shown) or shock when the head 16 is stop becomes very large even though the head 16 is raised onto the ramp 6. Thus, the head 16 may be damaged.

SUMMARY OF THE INVENTION

An aspect of the present general inventive concept provides a retracting method of compensating for a time for parking or unloading of a head with an additional floating force obtained by additional driving of a spindle motor for a predetermined period after a retract operation is started.

The present general inventive concept also provides a hard disk drive (HDD) adopting the retracting method.

The present general inventive concept also provides a computer-readable recording medium having a program to perform the retracting method.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a retracting method of a hard disk drive to retract a head to a retract area in response to detection of a retract condition, the method comprising driving a spindle motor at least for a predetermined period at the beginning of a retract operation to rotate a disk.

The retract condition may be a condition in which a driving power of the hard disk drive is suddenly blocked, and the spindle motor may be driven for the predetermined period using a charged power obtained by charging the driving power of the hard disk drive.

The retract condition may be a condition in which the driving power of the hard disk drive is not blocked, and the spindle motor may be driven for the predetermined period using a spindle motor driving power generated from the driving power of the hard disk drive.

The foregoing and/or other aspects of the present general inventive concept may also be achieved by providing a hard disk drive comprising a spindle motor to rotate a disk, a voice coil motor to move a head, and a controller to move the head to the retract area if a retract condition is detected, and to drive a voice coil motor using a back electromotive force generated in the spindle motor so that the disk can be rotated by driving the spindle motor at least for a predetermined period and the head can be completely moved to the retract area after the predetermined period.

The foregoing and/or other aspects of the present general inventive concept may also be achieved by providing a computer-readable recording medium having a program to perform a retracting method of a hard disk drive to retract a head to a retract area if a driving power of the hard disk drive is blocked, wherein the program controls the hard disk drive according to a process comprising obtaining a charged power by charging a driving power of the hard disk drive, if the driving power of the hard disk drive is blocked, driving a spindle motor using the charged power at least for a predetermined period at the beginning of a retract operation to rotate a disk, and driving a voice coil motor to move the head to the retract area using a back electromotive force generated in the spindle motor after the predetermined period.

The driving of the spindle motor may comprise additionally driving the spindle motor for the predetermined period after the retract operation is started such that an additional floating force is obtained, a time for parking and unloading is compensated for, and a stable retract operation is performed.

The driving of the spindle motor may comprise additionally driving the spindle motor for the predetermined period after the retract operation is started such that an additional back electromotive force is obtained by free rotation of the disk and a stable retract operation is performed.

The retracting method of the hard disk drive may further comprise no moving the head at a very fast speed for the retract operation such that a possibility that the head may be damaged by shock is prevented.

The retracting method of the hard disk drive may further comprise performing a stable parking and unloading operation in an emergency in which a power source is blocked such that a reliability of the hard disk drive is improved.

The foregoing and/or other aspects of the present general inventive concept may also be achieved by providing a retracting method of a hard disk drive, the method comprising supplying a spindle motor driving power to a spindle motor to rotate a disk at a first speed, detecting a retract condition of the hard disk drive, supplying a second spindle motor driving power to the spindle motor to further rotate the disk at a second speed upon detection of the retract condition, and moving a head to a retract area according to the second spindle motor driving power.

The foregoing and/or other aspects of the present general inventive concept may also be achieved by providing a retracting method of a hard disk drive, the method comprising detecting a retract condition of the hard disk drive when a spindle motor is driven by a spindle motor driving power to rotate a disk, detecting a power of a reset signal when a driving power of the hard disk drive is less than a predetermined level, and supplying a second spindle motor driving power to the spindle motor to further rotate the disk at a second speed upon detection of the retract condition and the power of reset signal.

The foregoing and/or other aspects of the present general inventive concept may also be achieved by providing hard disk drive comprising a spindle motor power source to supply a spindle motor driving power to a spindle motor to rotate a disk at a first speed, a controller to detect a retract condition of the hard disk drive, and to control the spindle motor power source to supply a second spindle motor driving power to the spindle motor to further rotate the disk at a second speed upon detection of the retract condition, and a voice coil motor to move a head to a retract area according to the second spindle motor driving power.

The foregoing and/or other aspects of the present general inventive concept may also be achieved by providing hard disk drive comprising a first detecting unit to detect a retract condition of the hard disk drive when a spindle motor is driven by a spindle motor driving power to rotate a disk, a second detecting unit to detect a power of a reset signal when a driving power of the hard disk drive is less than a predetermined level, and a controller to supply a second spindle motor driving power to the spindle motor to further rotate the disk at a second speed upon detection of the retract condition and the power of the reset signal.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 4 is a cross-sectional view illustrating a ramp illustrated in FIG. 3;

FIGS. 5A through 5D are graphs schematically illustrating a conventional retracting method;

DETAILED DESCRIPTION OF THE PREFERRED EMBODIMENTS

Figure 1:
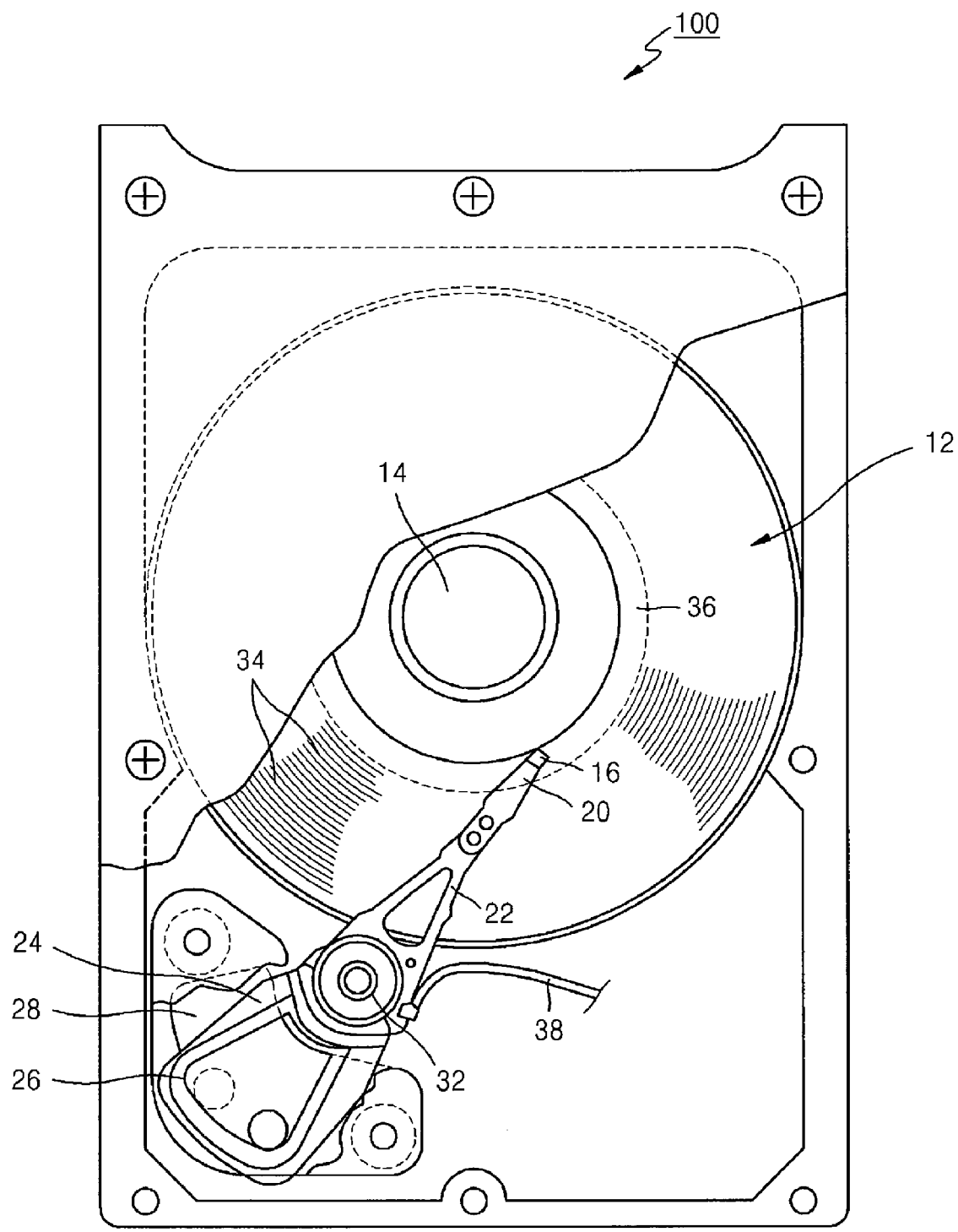
FIG. 1 illustrates a hard disk drive adopting a parking method.
Figure 2:
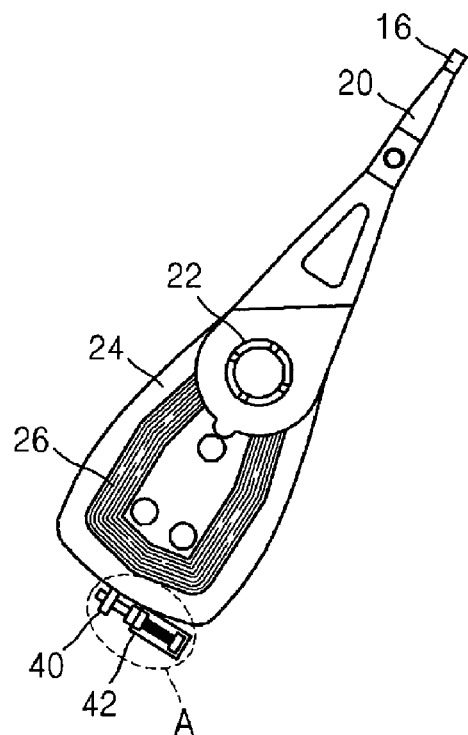
FIG. 2 illustrates a structure of a latch mechanism of a hard disk drive of FIG. 1.
Figure 3:
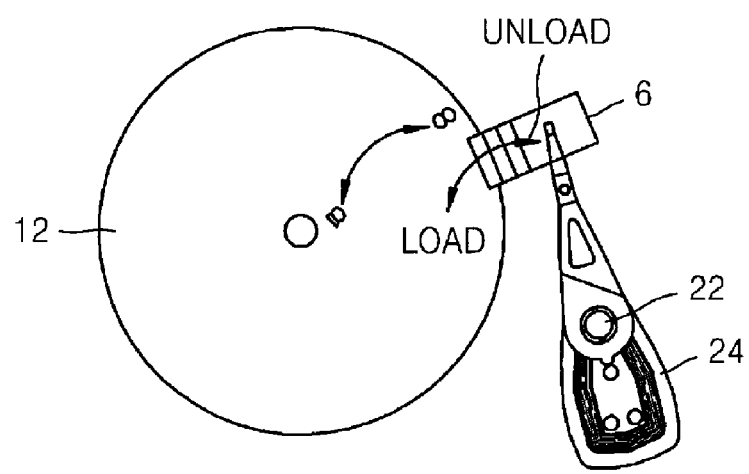
FIG. 3 illustrates the hard disk drive adopting a ramp method.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 6A:
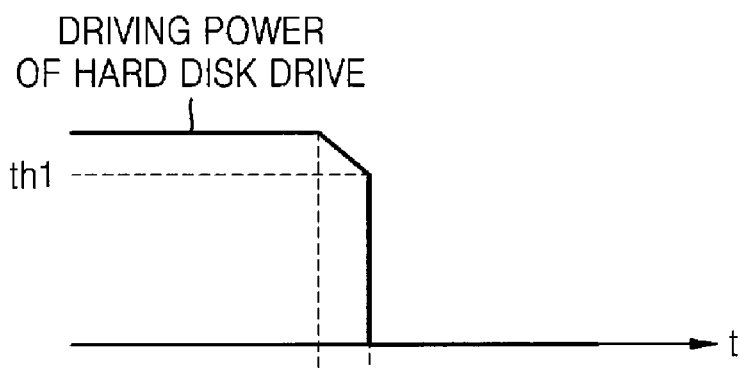
FIGS. 6A through 6C are graphs schematically illustrating a retracting method of a hard disk drive according to an embodiment of the present general inventive concept.
Figure 6B:
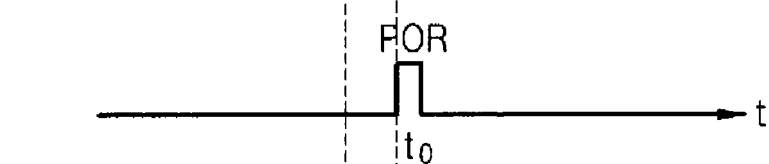
Figure 6C:
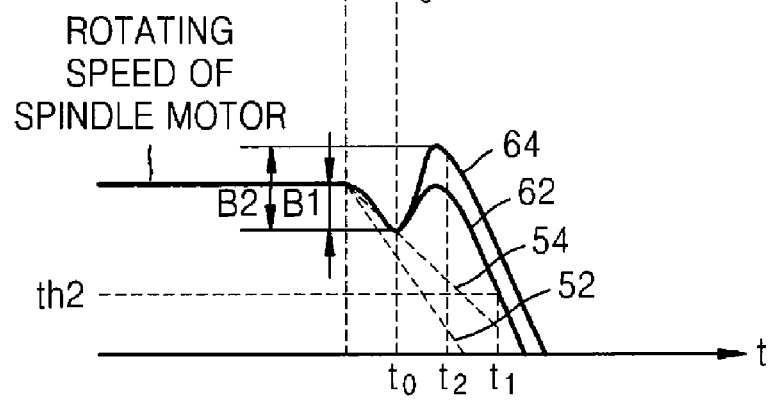

FIGS. 6A through 6C are graphs schematically illustrating a retracting method of a hard disk drive according to an embodiment of the present general inventive concept in a case where a driving power of the hard disk drive is suddenly blocked. FIG. 6A shows the driving power of the hard disk drive, FIG. 6B shows a power of reset signal (POR) generated when the driving power of the hard disk drive falls less than a predetermined threshold value th1, and FIG. 6C shows the rotation speed of a spindle motor adopting the retracting method according to the present embodiment. The hard disk drive according to the present embodiment may be used in the hard disk drive illustrated in FIGS. 1-4.

Referring to FIGS. 6A and 6B, the power reset signal POR is generated when the driving power of the hard disk drive falls less than the predetermined threshold value th1, and the retract operation is started from a point of time t0. The driving power may be a power to control the spindle motor to rotate a disk and a circuit unit to process data of the disk.

If the retract operation is started, the spindle motor remains to drive for a predetermined period, for example, from points of time t0 to t2 according to the present embodiment.

Referring to FIG. 6C, at a point of time when the power reset signal POR is detected, the spindle motor driving power is less than that of a normal state, that is, the spindle motor driving power is smaller than a value corresponding to a normal driving power of the hard disk drive. If the spindle driving motor driving power is blocked at the point of time t0 when the power reset signal POR is detected, a lower back electromotive force than a back electro-motive force generated when the disk stops at a designated rotating speed is generated in the spindle motor. The lower back electromotive force is illustrated as dotted lines 52 and 54 of FIG. 6C. In addition, the retract operation is delayed until the head is stabilized after the power reset signal POR was detected, the back electro-motive force generated in the spindle motor decreases than a desirable back electromotive force because the rotating speed of the spindle motor decreases by as much as a delay time.

Therefore, in the present embodiment, a second spindle motor driving power is supplied to the spindle motor for a predetermined period after the retract operation is started so as to obtain a floating force and a back electro-motive force enough to perform a safe retract operation.

A charging circuit is provided so as to drive the spindle motor in the state where the driving power of the hard disk drive is blocked. The charging circuit is charged using the driving power supplied to the hard disk drive and the charging circuit generates a power to additionally rotate the spindle motor when the driving power is not supplied to the hard disk drive or the spindle motor driving power is not supplied to the spindle motor. By applying a charged power obtained by the charging circuit to the spindle motor driver, the spindle motor remains to rotate for the point of time t0-t2 and thus obtains an additional floating force (B1 or B2) corresponding to graphs 62 or 64.

The charged power applied to the spindle motor driver is also blocked after the point of time t2. Accordingly, the spindle motor becomes to freely rotate according to the rotational inertia of the disk and generates the back electro-motive force. As the charged power applied to the spindle motor driver is blocked, the rotating speed of the spindle motor decreases gradually and stops after all.

In the hard disk drive adopting the parking method, the rotating speed of the spindle motor gradually decreases and stops, and the head is supposed to land on the parking zone. In this case, if the rotational inertia of the disk is small, the back electro-motive force of the spindle motor is small and the head does not reach the parking zone and lands on the data area of the disk. In the present embodiment, because of the charged power generated by the charging circuit as the spindle motor driving power after the retract operation starts, the spindle motor is additionally driven so that enough back electro-motive force to park the head can be generated. The back electro-motive force is transmitted from the spindle motor 14 to a voice coil motor of a magnetic assembly through a conductive line to control a voice coil driver connected to a voice coil to move the head to the parking zone.

Meanwhile, in the hard disk drive adopting the ramp method, the head is raised on the ramp by the back electro-motive force generated in the spindle motor. At this time, if the rotational inertia of the disk is small, the back electromotive force of the spindle motor is small and the head is unable to be raised on the ramp and lands on the data area of the disk. In the present invention, the spindle motor remains to additionally drive for a predetermined amount of time by the charged power generated by the charging circuit after the retract operation starts, so that the back electro-motive force enough to raise the head on the ramp can be generated.

In the hard disk drive adopting the parking method, as the rotating speed of the spindle motor gradually decreases and stops, the head lands on the parking zone. In the meantime, in the hard disk drive adopting the ramp method, the head is raised onto the ramp by the back electro-motive force generated in the spindle motor.

In the meantime, in the retract operation at the state where the driving power of the hard disk drive is not blocked, the charged power or the spindle motor driving power can be selectively employed.

In the present embodiment, the spindle motor driving power is generated by a power supply (not shown) of the hard disk drive. And the spindle motor driving power is used to drive the hard disk drive and to rotate the disk. The spindle motor driving power is blocked when the driving power of the hard disk drive is blocked. That is, the spindle motor driving power is not supplied to the spindle motor when the driving power is not supplied to the hard disk drive. On the contrary, the charged power is generated by the charging circuit and is not used to drive the hard disk drive but is used as a power that decreases gradually by a discharge when the driving power of the hard disk drive is blocked.

As shown in FIG. 6A through 6C, in the retracting method according to embodiments of the present general inventive concept, as the spindle motor is additionally driven for a predetermined amount of time after the retract operation starts, an additional back electro-motive force is obtained by free rotation of the disk so that a stable retract operation can be performed.

In the retracting method according to the present embodiment, as the spindle motor remains to rotate for the predetermined amount of time after the retract operation is started, and the back electro-motive force is obtained to move the head to the retract area from the spindle motor, so that a stable retract operation can be performed.

In addition, in the retracting method according to the present invention, since the head does not have to move at a very fast speed, a possibility that the head may be damaged by shock is reduced. It is possible that a first back electro-motive force may be generated according to a rotational inertia of the disk when a first spindle motor driving power supplied to the spindle motor in a normal state is terminated according to the retract condition, and that a second back electro-motive force may be generated when a second spindle motor driving power supplied to the spindle motor after the normal state, that is, detection of the power of the reset signal, is terminated. Accordingly, the head moves to the retract area, such as the parking zone or the ramp, according to the detection of the retract condition, the first back electro-motive force, the detection of the power of the reset signal, the second spindle motor driving power generated by the charging circuit or the power supply depending on the retract condition, and the second back electro-motive force, and/or a control of the voice coil drive generated due to the second back electro-motive force.

Figure 7:
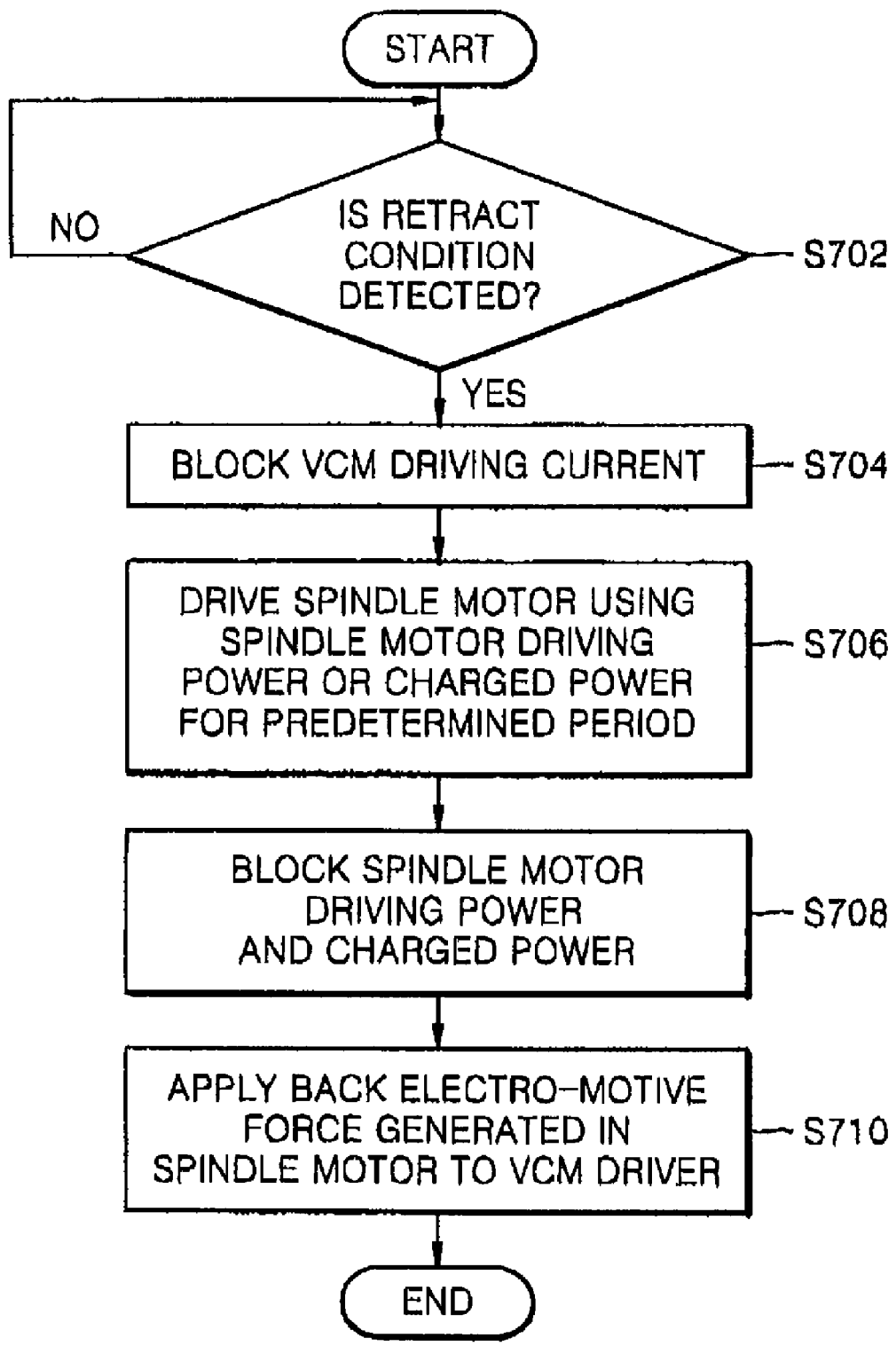
FIG. 7 is a flowchart illustrating the retracting method illustrated in FIGS. 6A through 6C.

FIG. 7 is a flowchart illustrating the retracting method of FIGS. 6A through 6C.

Firstly, when the spindle motor is driven to rotate the disk using a first spindle motor driving power, a retract condition is detected in operation S702.

The retract condition may be one of conditions occurring when an idle state is continued for a predetermined time, when an external shock is detected, when a free-fall is detected, when driving of the hard disk drive is terminated, when a driving power of the hard disk drive is suddenly blocked, and so on. The retract condition can be classified as a first condition where the driving power of the hard disk drive is suddenly blocked and a second condition where the driving power is not blocked.

If the retract condition is detected in operation S702, a voice coil motor (VCM) driving current is blocked in operation S704. If the VCM driving current is blocked, the head is located in a predetermined position of the disk, such as in a middle area (data area) of the disk, by a tension of a flexible printed circuit board (FPCB).

At the beginning of the retract operation, the spindle motor is driven for a predetermined time in operation S706. That is, the spindle motor driving power or the charged power is applied to the spindle motor driver for the predetermined time.

In the retracting method, in the case of the condition that the driving power of the hard disk drive is suddenly blocked, only the charged power is used. If the driving power is not blocked, either the spindle motor driving power or the charged power can be selectively used. Here, the predetermined period is at least a period required to rotate the spindle motor at a desired rotating speed.

In addition, the desired rotating speed of the spindle motor is determined in consideration of a rotational inertia of the disk. That is, the smaller the size of the disk is, the higher the desired rotating speed increases so that enough back electromotive force to perform a stable retract operation can be obtained.

In addition, the magnitude of the charged power is determined by the desired rotating speed of the spindle motor.

As illustrated in FIG. 6C, the graph 64 shows an example for setting the rotating speed of the spindle motor to be higher than a regular speed. To this end, the magnitude of the charged power is set to be higher than the regular spindle motor driving power so that the rotating speed of the spindle motor is set to the desired rotating speed for the predetermined period.

The spindle motor driving power or the charged power to the spindle motor driver is blocked after the predetermined period in operation S708. By the result, the back electromotive force is generated in the spindle motor.

The back electro-motive force generated in the spindle motor is applied to the VCM driver in operation S710.

The head is moved to a retract area by the operation of the VCM driver. Here, the retract area refers to either a parking zone or a ramp.

Figure 8:
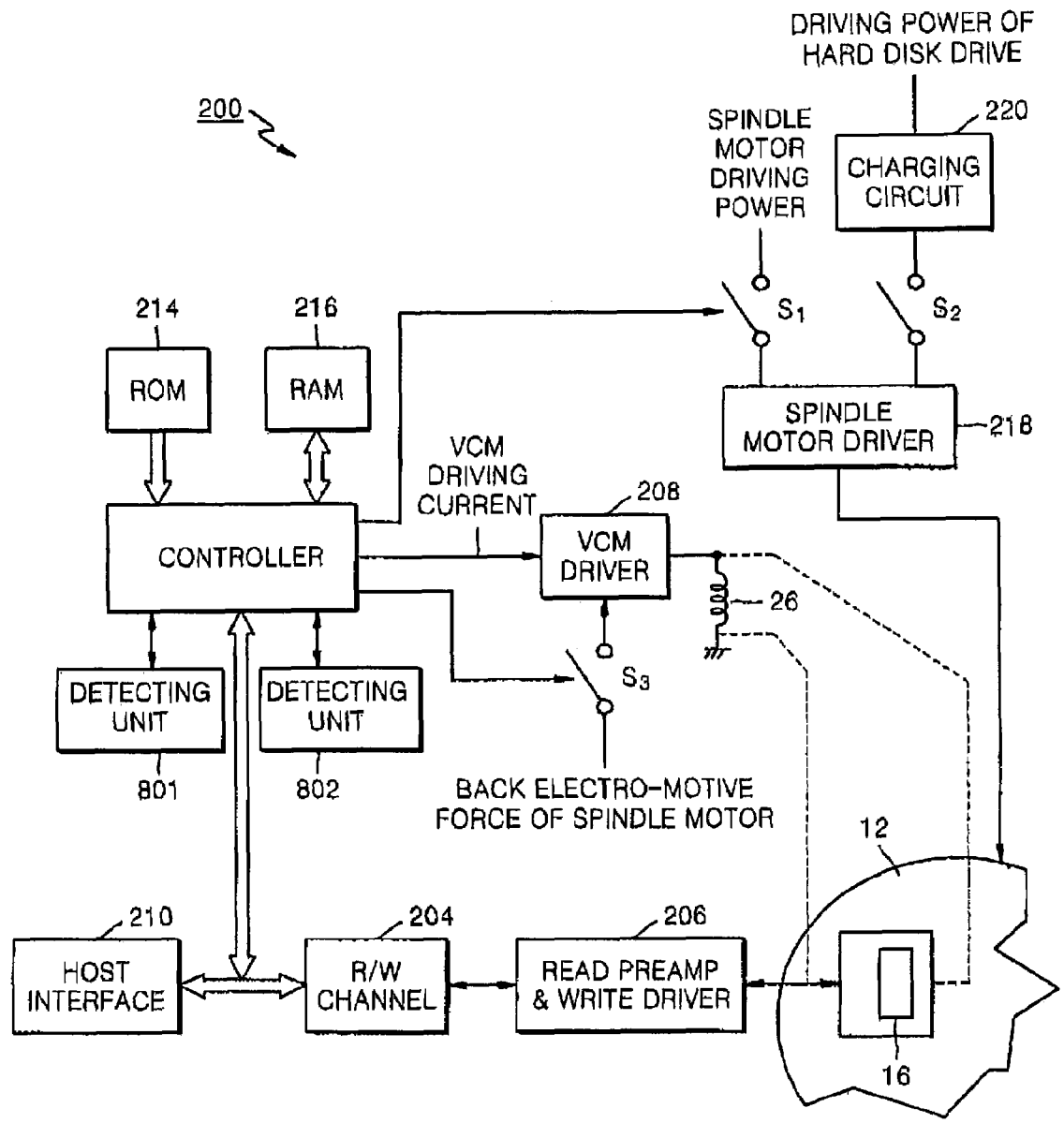
FIG. 8 is a block diagram illustrating an apparatus to control a hard disk drive adopting a retracting method according to an embodiment of the present general inventive concept.

FIG. 8 is a block diagram illustrating an apparatus 200 to control a hard disk drive adopting a retracting method according to an embodiment of the present general inventive concept.

The apparatus 200 includes a controller 202 combined with a head 16 operationally through a read/write (R/W) channel 204 and a read preamp & write driver 206. The controller 202 may be a digital signal processor (DSP), a microprocessor, a micro-controller, or the like. The apparatus 200 further includes a charging circuit 220.

A charging circuit 220 is charged by a driving power of the hard disk drive 200 and provides a charged power as the spindle motor driving power to a spindle motor driver 218 to drive a spindle motor. Switches $S_1$, and $S_2$ are provided to control the spindle motor driving power or the charged power.

The controller 202 supplies a control signal to the R/W channel 204 so as to read or record data from or on a disk 12. In addition, in the retract operation, the controller 202 controls switches $S_1$, through $S_3$ to selectively provide either the spindle motor driving power or the charged power output from the charging circuit 220 to the spindle motor driver 218 and to selectively provide the back electro-motive force generated in the spindle motor to the VCM driver 48. A switch $S_3$ is provided to control the hard disk drive to provide the back electro-motive force generated in the spindle motor to a VCM driver 48 to control the voice coil 26 to move the head 16.

Information is transmitted to a host interface 210 from the R/W channel 204. The host interface 210 includes a control unit to interface with a system such as a personal computer (PC).

In a data read mode, the R/W channel circuit 204 converts an analog signal read by the head 16 and amplified by the read pre-amplifier & write drive circuit 206 to a host computer-readable digital signal and outputs the digital signal to the host interface circuit 210. In a data write mode, the R/W channel circuit 204 receives data from the host computer via the host interface circuit 210, converts the data to a disk-recordable write current, and outputs the write current to the read pre-amplifier & write driver 206

The controller 202 communicates with the VCM driver 48 to supply a driving current to the voice coil 26. The controller 202 supplies a control signal to the VCM driver 48 so as to control excitation of the VCM and movement of the head 16.

The controller 202 communicates with a read-only memory (ROM) 214 or a nonvolatile memory, such as flash memory, and a random access memory (RAM) 216. The memory 214 and 216 include commands and data used by the controller 202 so as to run a software routine. The controller 202 communicates with a first detecting unit 801 to detect the retract condition of the hard disk drive as described above, and a second detecting unit 802 to detect a condition of the rotating speed of the spindle motor according to the power of the reset signal or the existence of the back electromotive force generated from the spindle motor due to the rotational inertia of the disk after the first or second spindle motor driving power which has been supplied to the spindle motor is not supplied.

As one of software routines, a program for performing the retracting method according to the present invention is included, as illustrated in FIG. 7.

If a retract condition is detected, the controller 202 controls the spindle motor driver 218, the VCM driver 208, and switches $S_1$-$S_3$ to perform a retract operation. The controller controls the switches $S_1$-$S_3$ to supply one of the spindle motor driving power and the charging power and to transmit the back electromotive force to the VCM driver 208 to move the head 16 to the retract area.

In the retract operation which corresponds to the case where the driving power of the hard disk drive is suddenly blocked, the controller 202 blocks the VCM driving current and applies the charged power provided by the charging circuit 220 to the spindle motor driver 218 for a predetermined period. After the predetermined period, the controller 202 blocks the charged power to be applied to the spindle motor driver 218 and the back electromotive force generated in the spindle motor is applied to the VCM driver 48.

In the mean time, in the retract operation which corresponds to the case where the driving power of the hard disk drive is not blocked, the controller 202 blocks the VCM driving current and applies the spindle motor driving power to the spindle motor driver 218 for a predetermined period. After the predetermined period, the controller 202 blocks the spindle motor driving power to be applied to the spindle motor driver 218 and the back electromotive force generated in the spindle motor to the be applied to the VCM driver 208.

The present general inventive concept can also be embodied as a method, an apparatus, or a system. When the present embodiment is embodied using software, the elements of the present general inventive concept are code segments that carry out essential works. Programs or code segments can be stored in a processor-readable medium or transmitted by a computer data signal combined with carrier waves via a transmission medium or communication network. The processor-readable medium is any data storage device that can store or transmit data which can be thereafter read by a computer system. Examples of the processor-readable medium include electronic circuits, semiconductor memory devices, read-only memory (ROM), flash memory, erasable ROM, floppy disks, optical disks, hard disks, optical fiber medium, radio frequency (RF) network, and the like. The computer data signal is any signal that can be transmitted onto an electronic network channel, optical fiber, air, an electronic field, a RF network, and the like.

As described above, in the retracting method of the hard disk drive according to the present embodiment, the spindle motor is additionally driven for the predetermined period after the retract operation is started such that an additional back electro-motive force is obtained by free rotation of the disk and a stable retract operation is performed.

In addition, in the retracting method of the hard disk drive according to the present invention, the spindle motor is additionally driven for the predetermined period after the retract operation is started such that an additional floating force is obtained, a time for parking and unloading is compensated for, and a stable retract operation is performed.

In addition, in the retracting method of the hard disk drive according to the present embodiment, the head does not have to move at a very fast speed for the retract operation such that a possibility that the head may be damaged by shock is prevented.

In addition, in the retracting method of the hard disk drive according to the retracting method, a stable parking and unloading operation can be performed even in an emergency in which a power source is blocked such that the reliability of the hard disk drive is improved.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A retracting method of a hard disk drive to retract a head to a retract area in a retract operation in response to detection of a retract condition, the method comprising:
   determining whether a driving power of a spindle motor is blocked; and
   selecting one of the driving power and a charged power to drive the spindle motor at least for a predetermined period at the beginning of the retract operation to rotate a disk.

2. The retracting method of claim 1, wherein:
   the retract condition is detected when a driving power of the hard disk drive is determined to be blocked; and
   the spindle motor is driven for the predetermined period using the charged power, the charged power obtained by charging the driving power of the hard disk drive.

3. The retracting method of claim 1, wherein:
   the retract condition is detected when a driving power of the hard disk drive is determined to be not blocked; and
   the spindle motor is driven for the predetermined period using the spindle motor driving power generated from the driving power of the hard disk drive.

4. The retracting method of claim 3, further comprising:
   blocking a voice coil motor driving current which is applied to a voice coil motor moving the head for the predetermined period.

5. The retracting method of claim 1, wherein the driving of the spindle motor comprises driving the disk for the predetermined period so that a rotating speed of the spindle motor is higher than a regular rotating speed of the spindle motor.

6. The retracting method of claim 5, wherein the driving of the disk comprises driving the disk to rotate at a rotating speed higher than the regular rotating speed of the spindle motor at the end of the predetermined period.

7. The retracting method of claim 6, wherein the rotating speed of the disk at the end of the predetermined period is determined depending on a size of the disk.

8. The retracting method of claim 7, wherein the rotating speed of the disk increases as the size of the disk decreases.

9. The retracting method of claim 1, further comprising:
   driving a voice coil motor to retract the head to the retract area using a back electro-motive force generated in the spindle motor driven at least for the predetermined period.

10. The retracting method of claim 1, wherein:
    the retract condition is detected when a driving power of the hard disk drive is determined to be blocked; and
    the driving of the spindle motor comprises:
       obtaining the charged power by charging the driving power of the hard disk drive,
       if the driving power of the hard disk drive is blocked, driving the spindle motor using the charged power at least for the predetermined period at the beginning of the retract operation to rotate the disk, and
       driving a voice coil motor to move the head to the retract area using a back electro-motive force generated in the spindle motor after the predetermined period.

11. The retracting method of claim 10, wherein a rotating speed of the spindle motor for the predetermined period is determined by a diameter of the disk.

12. The retracting method of claim 11, wherein the rotating speed of the spindle motor increases as the diameter of the disk decreases.

13. A hard disk drive comprising:
    a spindle motor to drive a disk to rotate:
    a controller to detect a retract condition, and to select at least one of a driving power of the hard disk drive and a charged power to drive the spindle motor at least for a predetermined period in a retract operation so as to retract a head to a retract area in a retract operation in response to the detection of the retract condition.

14. The hard disk drive of claim 13, further comprising:
    a voice coil motor to move the head,
    wherein, if the retract condition is detected, the controller drives the voice coil motor using a back electro-motive force generated in the spindle motor so that the disk can be rotated by driving the spindle motor at least for the predetermined period and the head can be completely moved to the retract area after the predetermined period.

15. The hard disk drive of claim 14, further comprising:
    a charging circuit to generate the charged power by charging the driving power of the hard disk drive,
    wherein the controller controls the spindle motor by using the charged power in response to the retract condition detected when the driving power of the hard disk drive is suddenly blocked.

16. The hard disk drive of claim 15, wherein an initial output of the charged power of the charging circuit is determined depending on a size of the disk.

17. The hard disk drive of claim 16, wherein the initial output increases as the size of the disk decreases.

18. A computer-readable recording medium having a program recorded thereon to perform a retracting method of a hard disk drive to retract a head to a retract area if a driving power of the hard disk drive is blocked, wherein the program controls the hard disk drive according to a process comprising:
    determining whether a driving power of a spindle motor is blocked; and
    selecting one of the driving power and a charged power to drive the spindle motor at least for a predetermined period at the beginning of the retract operation to rotate a disk.

19. The computer-readable recording medium of claim 18, wherein the process further comprises:
  obtaining the charged power by charging the driving power of the hard disk drive;
  if the driving power of the hard disk drive is blocked, driving a spindle motor by using the charged power at least for a predetermined period at the beginning of a retract operation to rotate the disk; and
  driving a voice coil motor moving the head to the retract area by using a back electro-motive force generated in the spindle motor after the predetermined period.

20. The computer-readable recording medium of claim 18, wherein a rotating speed of the spindle motor for the predetermined period is determined depending on a size of the disk.

21. The computer-readable recording medium of claim 20, wherein the rotating speed of the spindle motor increases as the size of the disk decreases.

22. The computer-readable recording medium of claim 21, wherein the rotating speed of the spindle motor at the end of the predetermined period is higher than a regular speed required for a normal operation of the hard disk drive.

23. A retracting method of a hard disk drive, comprising:
  supplying a spindle motor driving power to a spindle motor to rotate a disk at a first speed;
  detecting a retract condition of the hard disk drive;
  supplying a second spindle motor driving power to the spindle motor to further rotate the disk at a second speed upon detection of the retract condition; and
  moving a head to a retract area according to the second spindle motor driving power,
  wherein the second spindle motor driving power comprises a charged power obtained by charging a charging circuit using a driving power of the hard disk drive.

24. The retract method of claim 23, wherein the detecting of the retract condition comprises:
  terminating the supply of the spindle motor driving power to the spindle motor upon detection of the retract condition.

25. The retract method of claim 24, wherein the terminating of the supply of the spindle motor driving power comprises:
  driving a voice coil motor using a back electro-motive force generated from the spindle motor driven by the spindle motor driving power according to inertia of the spindle motor.

26. The retract method of claim 24, wherein the moving of the head comprises:
  driving a voice coil motor to move the head to the retract area of the disk using a back electro-motive force generated from the spindle motor driven by the second spindle motor driving power according to an inertia of the spindle motor.

27. The retracting method of claim 23, wherein the supplying of the second spindle motor driving power comprises:
  detecting a power of reset signal when a driving power of the hard disk drive is less than a predetermined level; and
  supplying the second spindle motor driving power to the spindle motor according to the detected power of a reset signal.

28. The retract method of claim 23, wherein the moving of the head comprises:
  driving a voice coil motor to move the head to the retract area of the disk using a back electro-motive force generated from the spindle motor driven by the charging power according to an inertia of the spindle motor.

29. The retract method of claim 23, wherein the second spindle motor driving power is supplied for a time period shorter than the spindle motor driving power.

30. The retract method of claim 23, further comprising:
  latching the head in the retract area using a latch mechanism after the head is moved to the retract area according to the second spindle motor driving power.

31. A retracting method of a hard disk drive, comprising:
  detecting a retract condition of the hard disk drive when a spindle motor is driven by a spindle motor driving power to rotate a disk;
  detecting a power of a reset signal when a driving power of the hard disk drive is less than a predetermined level; and
  supplying a second spindle motor driving power to the spindle motor to further rotate the disk at a second speed upon detection of the retract condition and the power of reset signal,
  wherein the second spindle motor driving power comprises a charged power obtained by charging a charging circuit using the driving power of the hard disk drive.

32. A hard disk drive, comprising:
  a spindle motor power source to supply a spindle motor driving power to a spindle motor to rotate a disk at a first speed;
  a controller to detect a retract condition of the hard disk drive, and to control the spindle motor power source to supply a second spindle motor driving power to the spindle motor to further rotate the disk at a second speed upon detection of the retract condition; and
  a voice coil motor to move a head to a retract area according to the second spindle motor driving power,
  wherein the second spindle motor driving power comprises a charged power obtained by charging a charging circuit using the driving power of the hard disk drive.

33. A hard disk drive, comprising:
  a first detecting unit to detect a retract condition of the hard disk drive when a spindle motor is driven by a spindle motor driving power to rotate a disk;
  a second detecting unit to detect a power of a reset signal when a driving power of the hard disk drive is less than a predetermined level; and
  a controller to selectively supply a second spindle motor driving power to the spindle motor to further rotate the disk at a second speed upon detection of the retract condition and the power of the reset signal, wherein the second spindle motor driving power comprises a charged power obtained by charging a charging circuit using the driving power of the hard disk drive.

34. A hard disk drive, comprising:
  a spindle motor to drive a disk to rotate;
  a spindle driving power unit to supply a first driving power to the spindle motor;
  a charging circuit to supply a second driving power to the spindle motor; and
  a controller to selectively supply at least one of the first and second driving power to the spindle motor according to detection of a retract condition and a power reset condition.

35. The hard disk drive of claim 34, wherein the controller supplies the second driving power to the spindle motor during a retract operation when the first driving power is blocked.

36. The hard disk drive of claim 34, wherein the controller supplies the second driving power to the spindle motor to increase a rotating speed of the spindle motor during a retract operation.

37. The hard disk drive of claim 34, wherein the controller supplies the second driving power to generate an additional back electro-motive force generated from the spindle motor to drive the voice coil motor during a retract operation.

38. A retracting method of a hard disk drive, comprising:
supplying a first spindle driving power to a spindle motor to drive a disk;
charging a charging power using a driving power of the hard disk drive;
detecting at least one of a retract condition and a power reset condition; and
selectively supplying at least one of a first spindle driving power and the charging power as a second spindle driving power according to the detection of the at least one of the retract condition and the power reset condition.

39. The method of claim 38, wherein the selectively supplying at least one of the first and second spindle driving power comprises supplying the second spindle driving power to the spindle motor during a retract operation when the first spindle driving power is blocked.

40. The method of claim 38, wherein the selectively supplying at least one of the first and second spindle driving power comprises supplying the second spindle driving power to the spindle motor to increase a rotating speed of the spindle motor during a retract operation.

41. The hard disk drive of claim 38, wherein the selectively supplying at least one of the first and second spindle driving power comprises supplying the second spindle driving power to generate an additional back electro-motive force generated from the spindle motor to drive the voice coil motor during a retract operation.

* * * * *